United States Patent
Kodavanji et al.

(10) Patent No.: US 12,106,119 B2
(45) Date of Patent: Oct. 1, 2024

(54) CLIENT UPDATE OF DATA MODIFICATION TRACKING STRUCTURE

(71) Applicant: HEWLETT PACKARD ENTERPRISE DEVELOPMENT LP, Houston, TX (US)

(72) Inventors: Mashood Abdulla Kodavanji, Karnataka (IN); Syed Ismail Faizan Barmawer, Karnataka (IN); Clarete Riana Crasta, Karnataka (IN); Gautham Bhat Kumbla, Karnataka (IN); Soumya Palakkattiri Narayanan, Karnataka (IN); Sharad Singhal, Belmont, CA (US); Ramya Ahobala Rao, Karnataka (IN); Rishi Kesh K Rajak, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 245 days.

(21) Appl. No.: 17/815,364

(22) Filed: Jul. 27, 2022

(65) Prior Publication Data
US 2024/0036883 A1 Feb. 1, 2024

(51) Int. Cl.
G06F 12/00 (2006.01)
G06F 9/445 (2018.01)
G06F 11/14 (2006.01)
G06F 12/1072 (2016.01)

(52) U.S. Cl.
CPC ...... *G06F 9/44505* (2013.01); *G06F 11/1458* (2013.01); *G06F 11/1469* (2013.01); *G06F 12/1072* (2013.01); *G06F 2201/84* (2013.01)

(58) Field of Classification Search
CPC ..................... G06F 11/1458; G06F 2201/84
See application file for complete search history.

(56) References Cited

U.S. PATENT DOCUMENTS

| | | | |
|---|---|---|---|
| 5,157,765 A | 10/1992 | Birk et al. | |
| 5,375,235 A | 12/1994 | Berry et al. | |
| 5,563,987 A | 10/1996 | Scott | |
| 5,594,860 A | 1/1997 | Gauthier | |
| 7,197,516 B1 | 3/2007 | Hipp et al. | |

(Continued)

FOREIGN PATENT DOCUMENTS

| | | |
|---|---|---|
| CA | 2028701 A1 | 5/1991 |
| CN | 103713972 | 4/2014 |
| EP | 0432896 A2 | 6/1991 |

OTHER PUBLICATIONS

Hewlett Packard Enterprise, OpenFAM Reference Implementation, Introduction, May 30, 2023 (4 pages).

(Continued)

*Primary Examiner* — John A Lane
(74) *Attorney, Agent, or Firm* — Trop, Pruner & Hu, P.C.

(57) ABSTRACT

In some examples, a client system, in response to a request to modify a first data page at a memory server in a remote access by a client over a network, sends, to the memory server, a request to update a data modification tracking structure stored by the memory server to indicate that the first data page is modified. The client system initiates an incremental data backup from the memory server to a backup storage system of data pages indicated as modified by the data modification tracking structure stored at the memory server.

20 Claims, 5 Drawing Sheets

(56) References Cited

U.S. PATENT DOCUMENTS

| | | | |
|---|---|---|---|
| 7,420,699 B2 | 9/2008 | Farrell et al. | |
| 8,095,723 B2 | 1/2012 | Kim et al. | |
| 8,631,203 B2 | 1/2014 | Fortin et al. | |
| 10,353,780 B1 | 7/2019 | O'Connell et al. | |
| 10,761,941 B1* | 9/2020 | Redko | G06F 11/1451 |
| 10,929,238 B2 | 2/2021 | Horowitz et al. | |
| 2015/0113019 A1 | 4/2015 | Jiang et al. | |
| 2018/0039434 A1* | 2/2018 | Balcha | G06F 3/0665 |
| 2019/0324868 A1 | 10/2019 | Shivanna et al. | |
| 2021/0271558 A1* | 9/2021 | Kumarasamy | G06F 11/3006 |
| 2021/0271563 A1* | 9/2021 | Appireddygari Venkataramana | G06F 3/065 |
| 2022/0404984 A1* | 12/2022 | Dornemann | G06F 11/1435 |

OTHER PUBLICATIONS

Hewlett Packard Enterprise, OpenFAM Reference Implementation, openfam:fam::fam_map, downloaded Jul. 10, 2023 (3 pages).

Morgan, Timothy Prickett, The Next Platform, The Future of System Memory is Mostly CXL, Jul. 5, 2022 (15 pages).

Smith, Ryan, CXL Compute Express Link, Compute Express Link (CXL) 3.0 Announced: Doubled Speeds and Flexible Fabrics, Aug. 2, 2022 (8 pages).

"OpenFAM Reference Implementation", A library for programming Fabric-Attached Memory, Aug. 30, 2021, 2 pages.

CXL Compute Express Link: The Breakthrough CPU-to-Device Interconnect, Retrieved Aug. 4, 2022, 2 Pgs.

Pfister, "An Introduction to the InfiniBand™ Architecture", Chapter 42, IBM Enterprise Server Group, Aug. 4, 2022, pp. 617-632.

Sensi et al., "An In-Depth Analysis of the Slingshot Interconnect", Aug. 20, 2020, 13 pages.

Vasavada et al., "Comparing Different Approaches for Incremental Checkpointing: The Showdown", 2011, 4 Pgs.

Wikipedia, "Remote direct memory access", available online at <https://en.wikipedia.org/w/index.php?title=Remote_direct_memory_access&oldid=1093871583>, Jun. 19, 2022, 3 pages.

* cited by examiner

CLIENT UPDATE OF DATA MODIFICATION TRACKING STRUCTURE

BACKGROUND

Fabric attached memory refers to memory that is accessible over a fabric by any of multiple clients. A "fabric" can refer to a network that allows for communications between computing nodes connected to the network. The fabric attached memory can be implemented using memory devices, such as flash memory devices or other types of persistent memory devices.

BRIEF DESCRIPTION OF THE DRAWINGS

Some implementations of the present disclosure are described with respect to the following figures.

Figure 1:
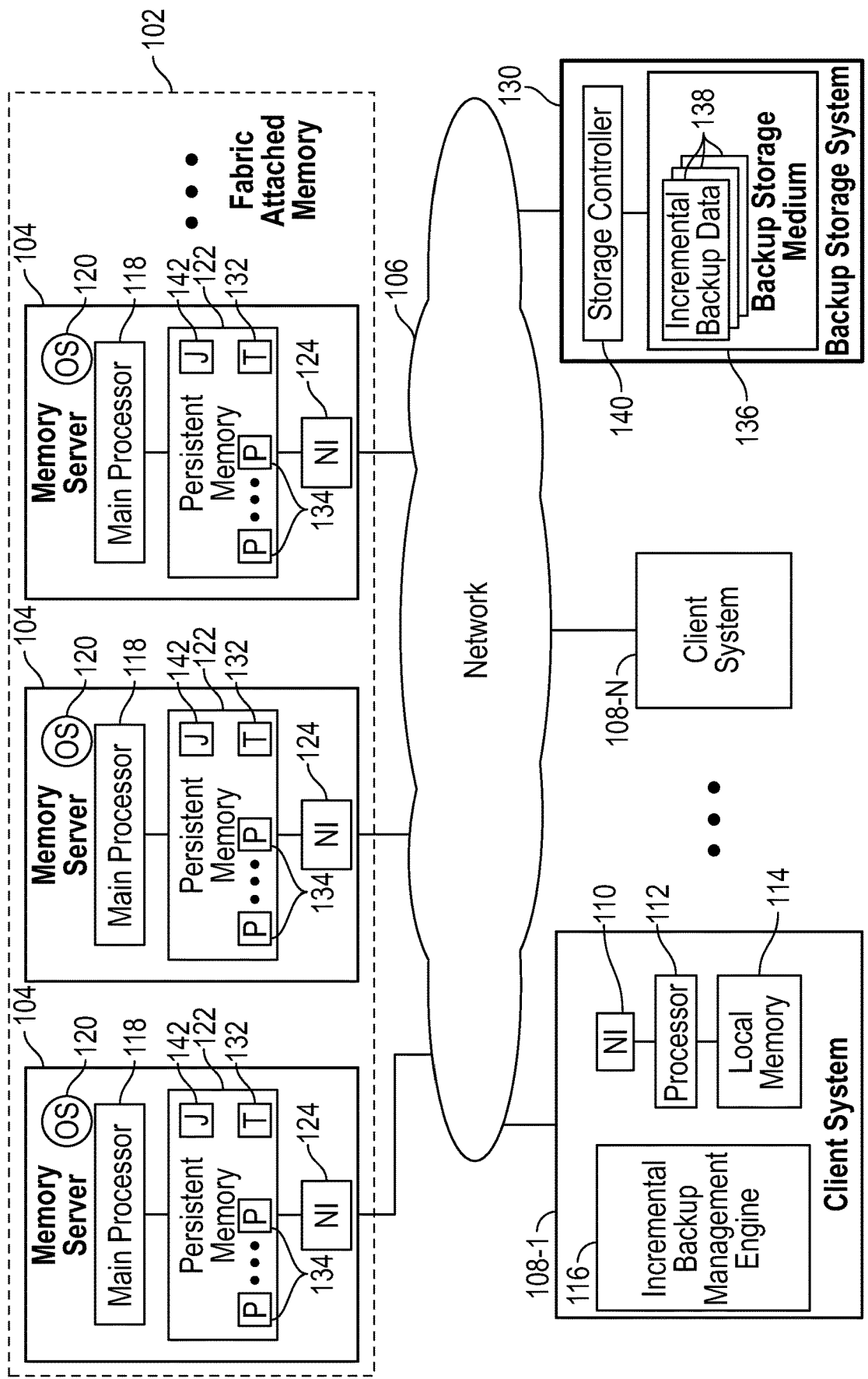
FIG. 1 is a block diagram of an arrangement that includes a fabric attached memory including memory servers coupled to a network, and client systems that are able to access the fabric attached memory over a network, and a backup storage system to which incremental data backup can be performed in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Clients are able perform remote access (remote read or remote write) of fabric attached memory. A "client" can refer to any entity (a machine or a program) that is able to issue requests to access data in the fabric attached memory. Examples of networks over which clients are able to access fabric attached memory include any or some combination of the following: a COMPUTE EXPRESS LINK (CXL) interconnect, a Slingshot interconnect, an InfiniBand interconnect, and so forth.

A fabric attached memory can include a distributed arrangement of memory servers, where each memory server can include a persistent memory or may be coupled to a persistent memory. In some examples, clients can access the fabric attached memory using Remote Direct Memory Access (RDMA) over a network.

An RDMA data transfer from a client to a memory server involves a transfer of data from the client over the network to a persistent memory of the memory server, where the data transfer does not involve work performed by a main processor of the memory server. A "main processor" of a memory server can refer to the processor that executes the operating system (OS) and other machine-readable instructions (including firmware such as a Basic Input/Output System or BIOS and an application program) of the memory server.

In an RDMA data transfer, data is passed to or from the client over the network through a network interface of the memory server from or to the persistent memory of the memory server. A "network interface" can refer to a network communication component that transmits and receives signals, messages, packets, etc. (more generally, "information"), over a network. The network interface can include a network transceiver that transmits and receives information.

A memory server can include main memory including a collection of memory devices (a single memory device or multiple memory devices), such as dynamic random access memory (DRAM) devices, static random access memory (SRAM) devices, and so forth. The memory server can also include cache memory, which can be part of the main processor or associated with the main processor. The cache memory is associated with the main processor if the main processor uses the cache memory to store data used by the main processor.

Note that since the data of the RDMA data transfer passes through the network interface of the memory server, the data may be stored in a memory of the network interface, and may be processed by a processor of the network interface. However, the processor and the memory of the network interface is separate and distinct from the main processor and the cache memory that is part of or associated with the main processor.

Data backup can be formed from a fabric attached memory. A data backup involves copying data at a collection of memory servers (a single memory server or multiple memory servers) to a backup storage system. A backup storage system can include a collection of storage devices (a single storage device or multiple storage devices), where a storage device can be implemented using a disk-based storage device, a solid-state drive, and so forth. If data at the fabric attached memory were to be lost or exhibit unrecoverable errors, a restore operation can be performed from the backup storage system to recover the lost data or to restore to a prior version of the data without errors.

In some examples, a full data backup can copy the entirety of the data of the fabric attached memory to the backup storage system. However, if there is a large amount of data stored at the fabric attached memory, then the full data backup can be expensive in terms of resource usage (e.g., usage of processing resources, usage of communication resources, etc.), and the full data backup can take a relatively long period of time to complete (e.g., many hours or days).

In other examples, incremental data backup can be performed, in which modified data portions are copied to the backup storage system, without copying unmodified data portions to the backup storage system. A data portion being "modified" refers to the data portion having been changed relative to a copy of the data portion stored at the backup storage system 130.

An incremental data backup can reduce the backup time and resource usage. Also, performing incremental data backup can reduce wear on hardware, such as storage media, since the quantity of writes to the storage media can be reduced as compared to a full data backup.

In examples where RDMA is used, because the main processors of memory servers are not involved in RDMA data transfers, the main processors of the memory servers do not track modified data portions (also referred to as "dirty data portions). If the memory servers of the fabric attached memory do not track modified data portions, then an incremental data backup would not be possible since the memory servers are without information of which data portions stored at the memory servers are modified (or dirty) and which are unmodified (or clean).

In accordance with some implementations of the present disclosure, a client-triggered update of a data modification tracking structure at a memory server of a fabric attached memory that is part of a remote access arrangement is performed in response to updates of data pages (or more simply "pages") by a client over a network to the memory server. A "remote access arrangement" can refer to an arrangement in which a client accesses data stored at a remote memory server that is coupled to the client over a network. A "page" can refer to any specified amount of data (the term "page" is used interchangeably with "data portion"). A page is the data unit at which a data modification tracking structure tracks data modification.

The data modification tracking structure tracks pages that have been modified. The data modification tracking structure is used to perform an incremental backup operation to a backup storage system in which modified pages are copied from the fabric attached memory to the backup storage system from the memory server, but unmodified pages are not copied from the fabric attached memory to the backup storage system.

By using the client-triggered update of a data modification tracking structure, memory servers would not have to be configured with logic to track modified pages. This can reduce the complexity and cost of memory servers of a fabric attached memory.

FIG. 1 is a block diagram of an example arrangement that includes a fabric attached memory 102 including a distributed arrangement of memory servers 104 that are connected to a network 106. Client systems 108-1 to 108-N (N≥1) also are connected to the network 106. Each client system can access the fabric attached memory 102.

FIG. 1 shows an arrangement of components of the client system 108-1. The remaining client system(s) (including 108-N) may have the same arrangement of components or a different arrangement of components. The client system 108-1 includes a network interface 110 to communicate over the network 106, a processor 112 to execute machine-readable instructions (including firmware, an operating system (OS), an application program, etc.) of the client system 108-1. The client system 108-1 also includes a local memory 114 to store local data at the client system 108-1. A "processor" can include a microprocessor, a core of a multi-core microprocessor, a microcontroller, a programmable integrated circuit, a programmable gate array, or another hardware processing circuit.

Examples of client systems include any or some combination of the following: a desktop computer, a notebook computer, a tablet computer, a server computer, a smartphone, a game appliance, an Internet-of-things (IoT) device, and so forth.

A client system is an example of a "client" that can issue a request to perform a remote access of the fabric attached memory 102. A program (including machine-readable instructions) that executes in the client system 108 can be another example of a "client."

In accordance with some implementations of the present disclosure, the client system 108-1 includes an incremental backup management engine 116. As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

The incremental backup management engine 116 in the client system 108-1 can perform client-triggered management of modified pages tracking by updating a modified pages tracking structure (discussed further below), and the incremental backup management engine 116 can initiate an incremental data backup from the fabric attached memory 102 over the network 106 to a backup storage system 130 connected to the network 106 using the modified pages tracking structure.

An incremental backup operation from a collection of memory servers 104 can be performed over the network 106 to the backup storage system 130. The backup storage system 130 may be located at a location that is remote from the fabric attached memory 102. The backup storage system 130 includes a backup storage medium 136 to store instances of incremental backup data 138. The backup storage medium 136 can include a collection of storage devices (a single storage device or multiple storage devices).

The instances of incremental backup data 138 can represent copies of backup data obtained at different points in time. For example, a first instance of incremental backup data 138 can include a copy of modified pages at a first time point, a second instance of incremental backup data 138 can include a copy of modified pages at a second time point, and so forth.

The backup storage system 130 includes a storage controller 140 to control access (read access and write access) of the backup storage medium 136. For example, the storage controller 140 can interact with a collection of memory servers 104 to perform an incremental backup operation to produce an instance of incremental backup data 138 that is stored in the backup storage medium 136. The storage controller 140 can also interact with the collection of memory servers 104 to perform a restore operation, to restore data to the collection of memory servers 104 from an instance of the incremental backup data 138.

Each memory server 104 includes a main processor 118 to execute an OS 120 of the memory server 104, as well as to execute other machine-readable instructions, such as firmware (e.g., BIOS code), application programs, and so forth. It is noted that each memory server 104 can include multiple different types of processors (including the main processor 118) to perform respective different functions. The "main processor" can include a single processor or multiple processors.

Each memory server 104 also includes a persistent memory 122 (which is the main memory of the memory server 104) that can store data on behalf of the client systems 108-1 to 108-N. A "persistent" memory refers to a memory that can maintain data stored in the memory even if power is removed from the memory. For example, persistent memory can include nonvolatile memory in which stored data is maintained (i.e., not lost) even when powered off. In another example, persistent memory can refer to an arrangement in which data of a memory is flushed to a backup storage (e.g., disk-based storage, etc.) when power is lost, followed by restoring the data from the backup storage to the memory after power is recovered.

The memory server 104 also includes a network interface 124 that enables the memory server 104 to communicate over the network 106.

In examples where a client system, such as the client system 108-1, is able to perform an RDMA access of the fabric attached memory 102, an RDMA data transfer would cause data to be transmitted from the client system over the network 106 to selected memory servers 104 of the fabric attached memory 102. The data of the RDMA data transfer would pass through the network interface 124 of each of the selected memory servers 104, and is written to the persistent memory 122 of each of the selected memory servers 104, without involving the main processor 118 of each of the selected memory servers 104. In the RDMA data transfer, processing cycles of the main processor 118 of the memory server 104 are not employed for placing the data into the persistent memory 122.

In the example of FIG. 1, each persistent memory 122 of the respective memory server 104 stores a modified pages tracking bitmap 132, which is an example of a modified pages tracking structure mentioned further above. The modified pages tracking bitmap 132 contains a collection of bits (e.g., an array of bits) that represent modification states of respective pages 134 stored in the persistent memory 122 of the respective memory server 104. Although FIG. 1 shows the modified pages tracking bitmap 132 stored in the persistent memory 122, in other examples, the modified pages tracking bitmap 132 can be stored in a different memory of the memory server 104, such as a cache memory or another memory.

Any given bit of the modified pages tracking bitmap 132 can have a first value or a second value different from the first value. For example, the first value can be 1 or 0, while the second value can be 0 or 1 (that is the opposite of the first value). More specifically, if a bit has a value 1 (an example of the first value), then that indicates a corresponding page is modified. On the other hand, if a bit has a value 0 (an example of the second value), then that indicates a corresponding page is unmodified. If the given bit of the modified pages tracking bitmap 132 has the first value, then that indicates that the corresponding page 134 is modified. On the other hand, if the given bit of the modified pages tracking bitmap 132 has the second value, then that indicates that the corresponding page 134 is unmodified. A page being "modified" refers to the page having been changed relative to a copy of the page stored at the backup storage system 130.

In other examples, other forms of modified pages tracking structures can be employed instead of the modified pages tracking bitmaps 132. More generally, a modified pages tracking structure includes a collection of entries, where each entry can have a first value to indicate that a corresponding page is modified, and a second value to indicate that the corresponding page is unmodified. Thus, a first entry of the modified pages tracking structure can indicate whether or not a first page is modified, a second entry of the modified pages tracking structure can indicate whether or not a second page is modified, and so forth.

Figure 2:
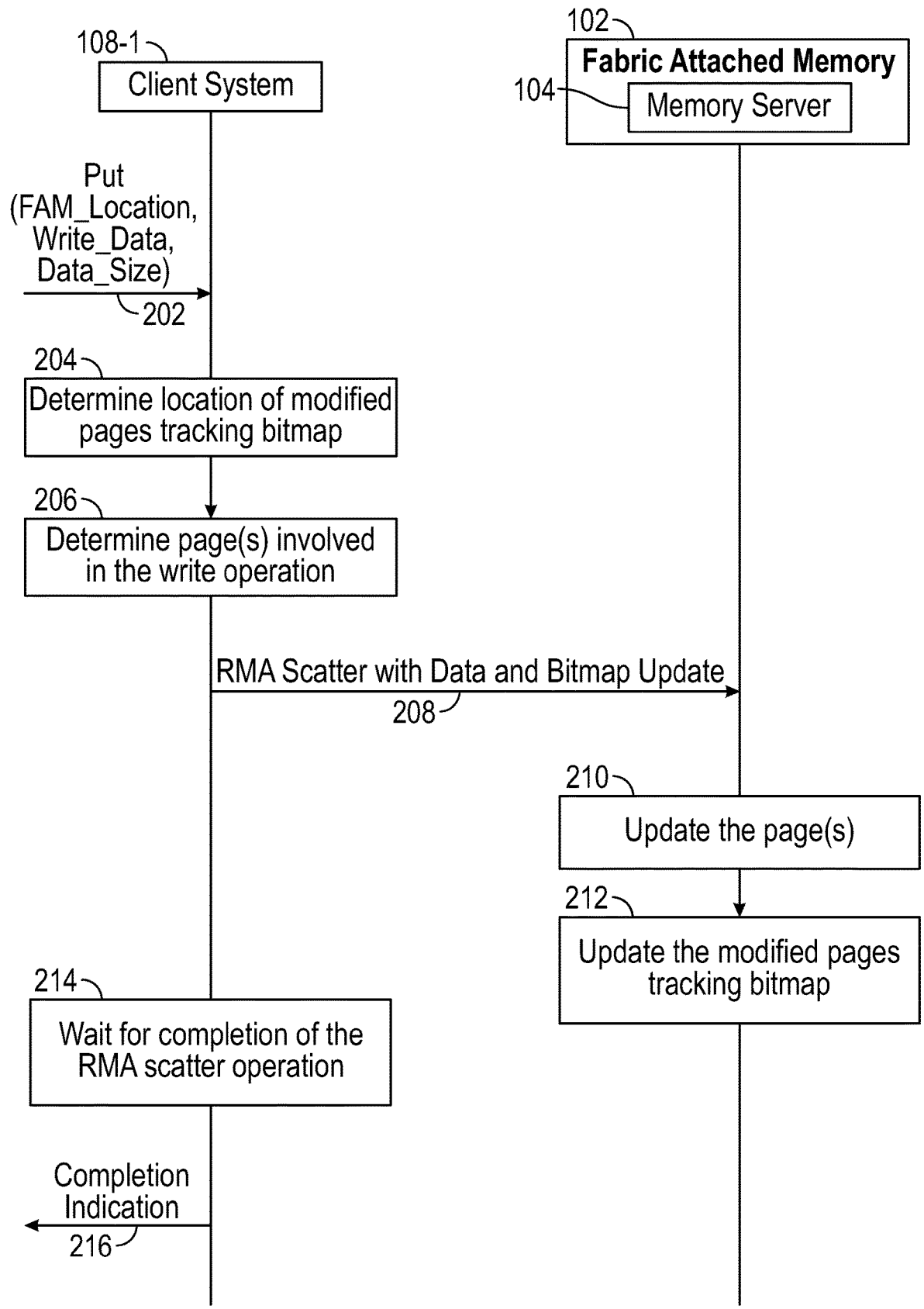
FIG. 2 is a message flow diagram of a process to write_data from a client system to a fabric attached memory, according to some examples.

FIG. 2 is a message flow diagram of a process in which the client system 108-1 writes data to the fabric attached memory 102. Although FIG. 2 shows an operation that involves one memory server 104 in the fabric attached memory 102, in other examples, the process of FIG. 2 can involve multiple memory servers 104 in the fabric attached memory 102. Also, although FIG. 2 shows a specific order of tasks, in other examples, the tasks can be performed in a different order, some of the tasks may be omitted or replaced, and/or additional tasks may be added.

The client system 108-1 receives (at 202) a write request to write data to the fabric attached memory 102. In the example of FIG. 2, the write request is a Put(FAM_Location, Write_Data, Data_Size) request. The write request can be sent by a requester in the client system 108-1 (e.g., a program in the client system 108-1) or external of the client system 108-1. The parameter Fam_Location in the Put( ) request includes a memory address, such as a memory address within the persistent memory 122 of the memory server 104. In some examples, the memory address can be a starting address offset that identifies the memory location at which the write data represented by Write_Data is to be written to the persistent memory 122. In some examples, the Put( ) request can also include a Data_Size parameter that specifies the size of the write data, Write_Data.

In response to the Put( ) request, the client system 108-1, and more specifically the incremental backup management engine 116, determines (at 204) a location of the modified pages tracking bitmap 132 in the memory server 104. The location of the modified pages tracking bitmap 132 can be indicated by a memory address of a location in the persistent memory 122, or a location in another memory in the memory server 104. In some examples, the incremental backup management engine 116 can determine the location of the modified pages tracking bitmap 132 based on configuration information stored in the client system 108-1, or based on information retrieved from a source external of the client system 108-1.

The client system 108-1 determines (at 206) which page(s) in the persistent memory 122 of the memory server 104 is (are) involved in the write operation specified by the Put( ) request.

In some examples, the client system 108-1 can map memory addresses of the persistent memory 122 of the memory server 104 to respective page numbers. For example, since the size of each page is predefined, the page contains data in a respective range of memory addresses. Given the memory address specified by FAM_Location, the client system 108-1 can identify which page includes the memory address specified by FAM_Location. The identified page has a page number that refers to the identified page. In this manner, the client system 108-1 can identify the starting page number of the starting page that contains the memory address specified by FAM_Location.

Also, once the starting page is identified, the client system 108-1 can determine, based on the size of the write data specified by Data_Size, whether the write data would be written to just the starting page or to a collection of the starting page and other page(s). The size of the write data is such that the write data is to be written to the starting page plus other page(s), then the pages involved in the write operation would include the starting page and the successive page(s) following the starting page.

The incremental backup management engine 116 in the client system 108-1 then issues (at 208) a remote memory access (RMA) scatter operation (at 208) to the fabric attached memory 102. The RMA scatter operation performs both a data update for the write request (to update the page(s) determined at 206 as being involved in the write) and the bitmap update of the modified pages tracking bitmap 132 in the memory server 104. An RMA scatter operation refers to one operation in which updates of different data structures at a fabric attached memory are initiated by a remote entity, in this case the client system 108-1.

In the example of FIG. 2, the data structures to be updated by the RMA scatter operation include the page(s) determined at 206 and the modified pages tracking bitmap 132, in one input/output (I/O) operation. With the RMA scatter operation, one I/O operation can be issued to update both the page(s) and the modified pages tracking bitmap 132, instead of issuing multiple distinct I/O operations to do so. The RMA scatter operation is issued by sending an RMA scatter request that specifies the page number(s) (or alternatively, memory addresses) of the page(s) involved in the update, and a memory address of the modified pages tracking bitmap 132 to be updated to reflect the modified state of the page(s).

In some examples, the RMA scatter operation is according to RDMA, in which an update of data (including the page(s) and the modified pages tracking bitmap 132) in the persistent memory 122 of the memory server 104 is performed without involving the main processor 118 of the memory server 104.

In response to the RMA scatter operation, the memory server 104 updates (at 210) the page(s) identified by the page number(s) specified by the RMA scatter request, and the memory server 104 updates (at 212) corresponding bit(s) of the modified pages tracking bitmap 132. The updated bit(s) of the modified pages tracking bitmap 132 reflect the modified state of the page(s) identified by the page number(s) specified by the RMA scatter request.

In an example, if a single page is updated in response to the RMA scatter operation, then a single bit corresponding to the single page in the modified pages tracking bitmap 132 is changed from the second value (e.g., 0 indicating unmodified) to the first value (e.g., 1 indicating modified). On the other hand, if multiple pages are modified in response to the RMA scatter operation, then multiple bits corresponding to the multiple pages in the modified pages tracking bitmap 132 are changed from the second value to the first value.

The client system waits (at 214) for completion of the RMA scatter operation. In some examples, the memory server 104 can return a completion indication to the client system 108-1 when the page(s) and the modified pages tracking bitmap 132 have been updated according to the RMA scatter operation.

In response to receiving the completion indication from the memory server 104, the client system 108-1 returns (at 216) a completion indication to the requester that sent the Put( ) request. The requester can be in the client system 108-1 or external of the client system 108-1.

Figure 3:
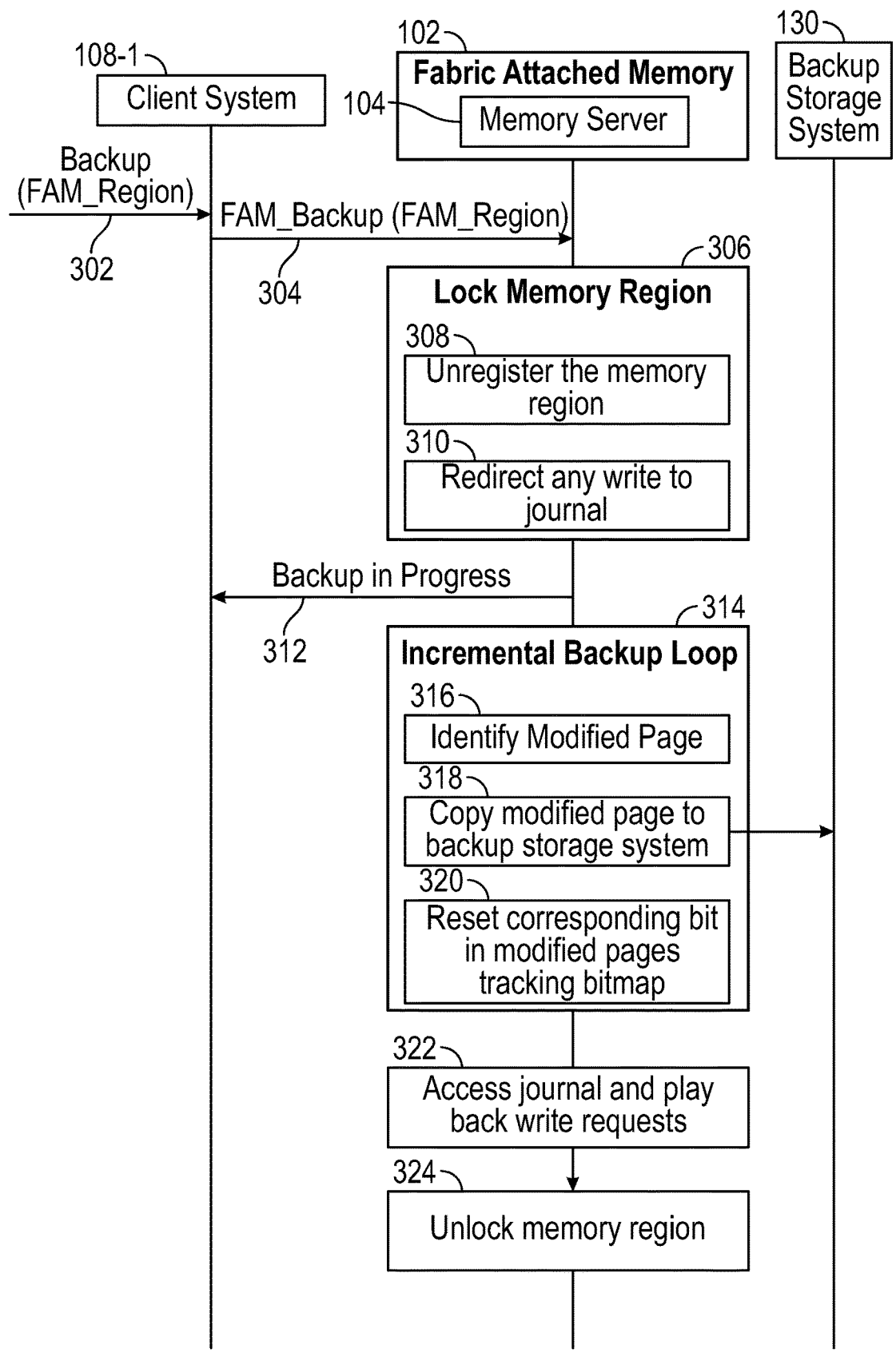
FIG. 3 is a message flow diagram of a process of performing incremental data backup from a fabric attached memory to a backup storage system, according to some examples.

FIG. 3 is a message flow diagram of a client-initiated incremental data backup operation to perform an incremental data backup from the fabric attached memory 102 to the backup storage system 130. Although FIG. 3 shows an example process that involves just a single memory server 104 in the fabric attached memory 102, the process of FIG. 3 can also involve multiple memory servers 104 in other examples. Also, although FIG. 3 shows a specific order of tasks, in other examples, the tasks can be performed in a different order, some of the tasks may be omitted or replaced, and/or additional tasks may be added.

The client system 108-1 receives (at 302) a data backup request perform a data backup from the fabric attached memory 102 to the storage system 130. In the example of FIG. 3, the data backup request is a Backup(FAM_Region) request. The data backup request is received from a requester, which can be inside the client system 108-1 or external of the client system 108-1.

The parameter FAM_Region in the Backup(FAM_Region) request specifies a memory region of the fabric attached memory 102. A memory region can be a portion of the fabric attached memory 102 that is allocated to store a data item (or multiple data items). A "data item" can refer to a file, an object, a collection of files or objects, or any other identifiable unit of data. The parameter FAM_Region can have an identification value that identifies the memory region. Different memory regions of the fabric attached memory 102 are assigned different identification values (e.g., different numbers, different character strings, etc.).

A memory region can be distributed across multiple memory servers 104 (i.e., data of the memory region is stored in multiple persistent memories 122 of the memory servers 104). Note that the parameter FAM_Location in the Put( ) request (received at 202 in FIG. 2) can refer to a memory address in the memory region.

In response to the Backup(FAM_Region) request, the incremental backup management engine 116 of the client system 108-1 sends (at 304) a backup request (e.g., FAM_Backup(FAM_Region) request).

In response to the FAM_Backup(FAM_Region) request, the memory server 104 locks (at 306) the memory region identified by FAM_Region. Locking the memory server 104 refers to preventing any further data updates in the memory region, i.e., new data cannot be written to the memory region, and no data in the memory region can be modified.

In some examples, locking the memory region identified by FAM_Region includes unregistering (at 308) the memory region identified by FAM_Region. The memory server 104 may maintain a registered memory region data structure (e.g., a list or other type of data structure) storing memory regions that have been allocated to store data on behalf of client systems. Once a new memory region is allocated and ready to accept data updates, the new memory region is "registered" with the memory server 104 by adding an identification value that identifies the new memory region to the registered memory region data structure. Unregistering a given memory region can refer to removing the identification value for the given memory region from the registered memory region data structure. An unregistered memory region of the fabric attached memory 102 is inaccessible over the network 106 for updates.

While the memory region identified by FAM_Region is locked, any writes to the memory region will be redirected (at 310) to a journal 142 in the memory server 104. In other words, in response to a write request to the locked memory region, the write request is redirected to the journal 142, and no write is performed to the locked memory region.

In some examples, as shown in FIG. 1, the journal 142 can be stored in the persistent memory 122 of the memory server 104. In other examples, the journal 142 may be stored in another memory of the memory server 104.

A "journal" can refer to any data structure that is to hold write requests that cannot be processed with respect to a memory region due to the memory region being locked.

In other examples, instead of unregistering a memory region of the fabric attached memory 102 to lock the memory region, a different locking mechanism can be used. For example, each memory region may be associated with a lock indicator (e.g., flag) that if set to a first value indicates that the memory region is locked and if set to a different second value indicates that the memory is not locked.

After locking (at 306) the memory region, the memory server 104 returns (at 312) a backup in progress indication to the client system 108-1, to indicate that the data backup is in progress.

The memory server 104 performs (at 314) an incremental backup loop in which the memory server 104 iteratively copies modified pages of the memory server 104 to the backup storage system 130. The memory server 104 identifies (at 316), based on the modified pages tracking bitmap 132, a page that has been modified (i.e., the corresponding bit for the page has the first value). The memory server 104 then copies (at 318) the identified modified page to the backup storage system 130. After the page is copied to the backup storage system 130, the memory server 104 resets (at 320) the corresponding bit in the modified pages tracking bitmap 132, which changes the corresponding bit from the first value to the second value to indicate that the page is unmodified.

The memory server 104 then performs another iteration to identify another modified page to backup to the backup storage system 130, and continues the incremental backup loop 314 until all modified pages identified by the modified pages tracking bitmap 132 have been backed up.

In some examples, it is noted that the modified pages are not individually written in distinct I/O operations to the backup storage system 130; rather, one I/O operation can write the modified pages identified in the incremental backup loop 314 to the backup storage system 130.

Upon completion of the incremental backup loop 314 (i.e., after copying all modified pages identified by the modified pages tracking bitmap 132 to the backup storage system 130), the memory server 104 accesses (at 322) the journal 142, and plays back the write requests in the journal 142 to complete the I/O operations specified by the write requests. The write requests played back from the journal 142 cause writes of corresponding data to the memory region (that still remains locked for write requests received from client systems).

After all the write requests in the journal 142 have been played back, the memory server 104 unlocks (at 324) the locked memory region (identified by FAM_Region), to enable for updates of the unlocked memory region in response to write requests from client systems. Unlocking the memory region can include registering the memory region with the registered memory region data structure.

In some examples, a client system or a requester that is part of or is coupled to the client system can check the status information of all previously issued backups using a backup status application programming interface (API). For example, the client system or requester can send a status inquiry including the identification value of a memory region to the backup status API, which returns information pertaining to when incremental backups were performed for the memory region, and information identifying each incremental backup instance. Such information can be used to perform a restore operation, for example, in case of data loss or data corruption at the client system or requester.

Figure 4:
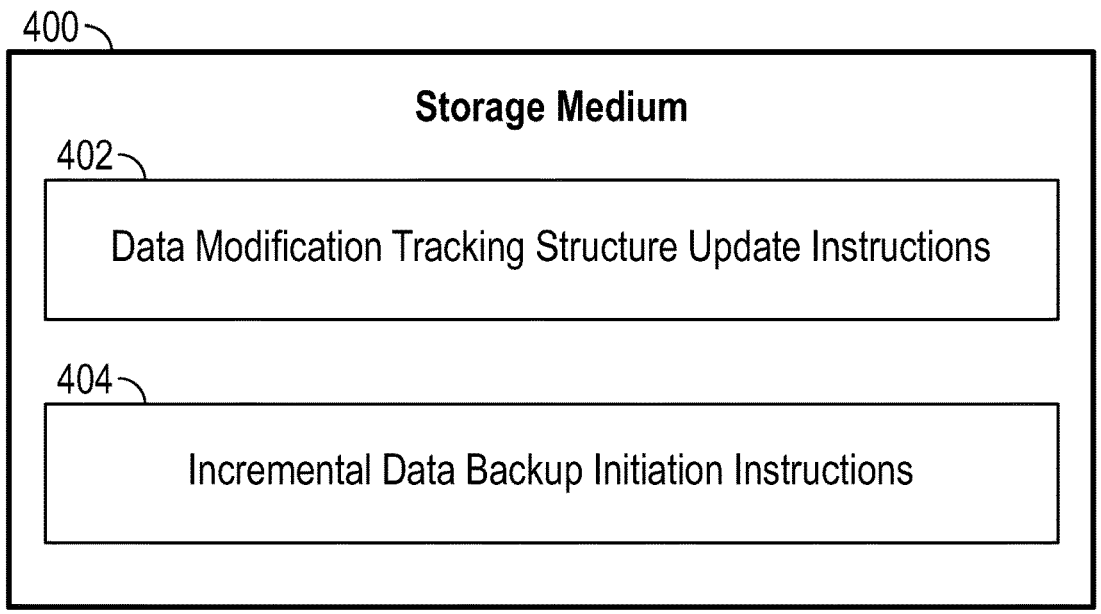
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a client system to perform various tasks.

The machine-readable instructions include data modification tracking structure update instructions 402 to, in response to a request to modify a first data page at a memory server in a remote access by a client over a network, send, from the client system to the memory server, a request to update a data modification tracking structure stored by the memory server to indicate that the first data page is modified. In some examples, the data modification tracking structure includes the modified pages tracking bitmap 132 of FIG. 1.

In some examples, the machine-readable instructions receive a write request to write data to a fabric attached memory including the memory server, and in response to the write request, the machine-readable instructions determine a collection of data pages (one data page or multiple data pages) involved in a write operation specified by the write request, and issue an I/O scatter operation (e.g., the RMA scatter operation issued at 208 in FIG. 2) to the fabric attached memory to update the collection of data pages involved in the write operation, and to update the data modification tracking structure.

In some examples, the issuance of the I/O scatter operation includes sending a scatter request that includes information identifying the collection of data pages (e.g., page numbers and/or memory addresses of pages) and a memory address of the data modification tracking structure.

The machine-readable instructions include incremental data backup initiation instructions 404 to initiate, by the client system, an incremental data backup from the memory server to a backup storage system of data pages indicated as modified by the data modification tracking structure stored at the memory server.

In some examples, the memory server is part of a fabric attached memory including a plurality of memory servers, where the incremental data backup is of data pages from multiple memory servers of the plurality of memory servers to the backup storage system.

In some examples, each memory server of the multiple memory servers includes a respective data modification tracking structure indicating which data pages are modified, where the incremental data backup is of the data pages from the multiple memory servers to the backup storage system identified as modified by the data modification tracking structures in the multiple memory servers.

In some examples, the request to modify is to perform a modification of the first data page according to a RDMA write by the client system of a memory of the memory server over the network.

In some examples, the update of the data modification tracking structure is according to a RDMA write by the client system of a memory of the memory server over the network.

Figure 5:
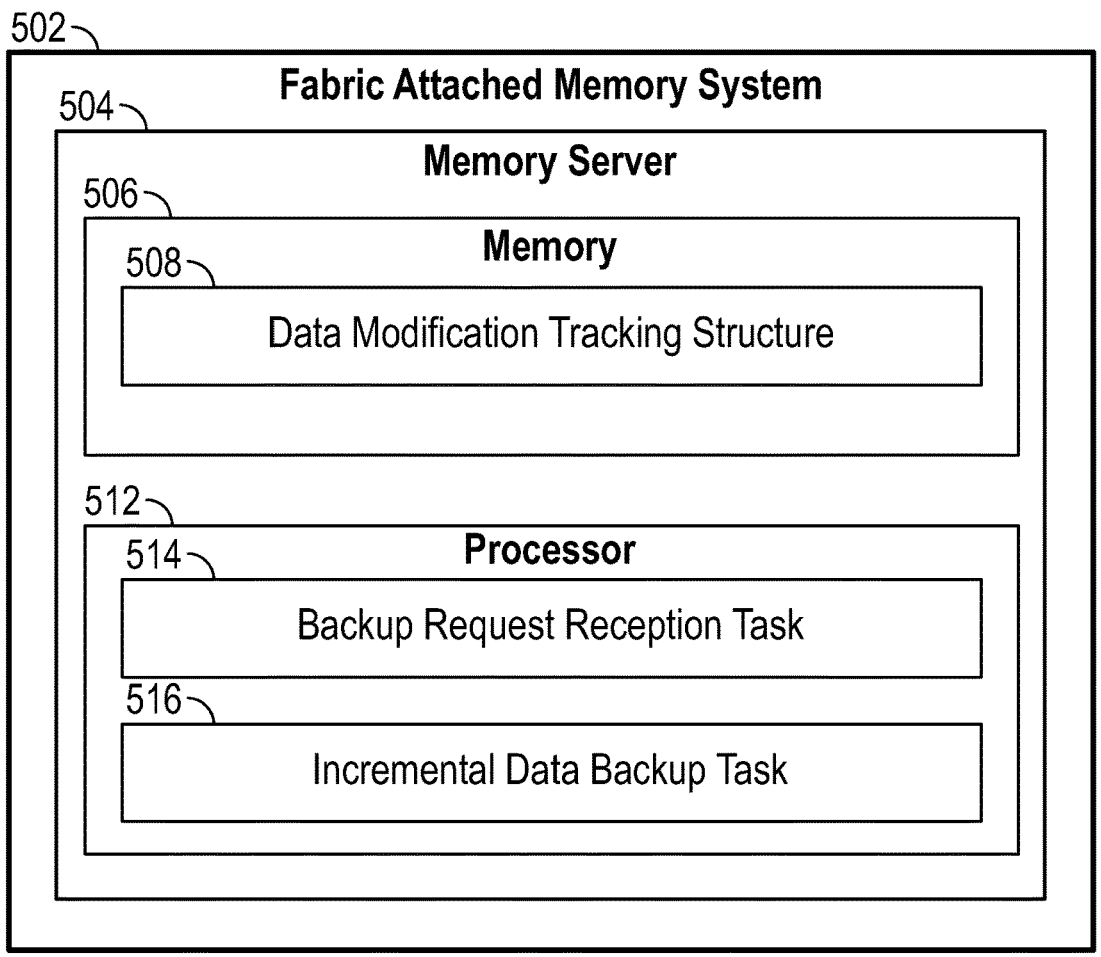
FIG. 5 is a block diagram of a fabric attached memory system according to some examples.

FIG. 5 is a block diagram of a fabric attached memory system 502 according to some examples. The fabric attached memory system 502 includes an arrangement of processing, communication, and storage resources to provide a fabric attached memory for remote access by client systems over a network.

The fabric attached memory system 502 includes a memory server 504 including a memory 506 to store a data modification tracking structure 508.

The fabric attached memory system 502 includes a network interface 510 to communicate over a network with a client system. The network interface 510 can receive, from the client system, an update request to update the data modification tracking structure 508. The update request can be an RDMA write of the data modification tracking structure 508 in the memory 506. The update request is responsive to a write request to write data from the client system to the memory server 504, where the update request is to cause a modification of the data modification tracking structure 508 to indicate that a collection of data pages is modified responsive to the write request.

The memory server 504 includes a processor 512 (e.g., the main processor 118 of FIG. 1) to perform various tasks. A processor performing a task can refer to a single processor performing the task or multiple processors performing the task.

The tasks include a backup request reception task 514 to receive a backup request from the client system. The tasks include an incremental data backup task 516 to, in response to the backup request, identify, based on the data modification tracking structure 508, the collection of data pages that has been modified, and perform an incremental data backup of the collection of data pages from the memory server 504 to a backup storage system.

In some examples, the update request includes an RDMA write of the memory 506 of the memory server 504 that updates the data modification tracking structure 508.

In some examples, the update request is part of an I/O scatter operation that is to update the data modification tracking structure 508 and the collection of data pages.

In some examples, the processor 512 is to, in response to the backup request from the client system, lock a memory region in the memory 506 of the memory server 504 to prevent updates of the memory region by further write requests from the client system, and redirect the further write requests to a journal in the memory server 504.

In some examples, the processor 512 is to, after a completion of the incremental data backup, play back the further write requests from the journal to update the memory region according to the further write requests.

In some examples, the processor 512 is to, after playing back the further write requests from the journal, unlock the memory region.

Figure 6:
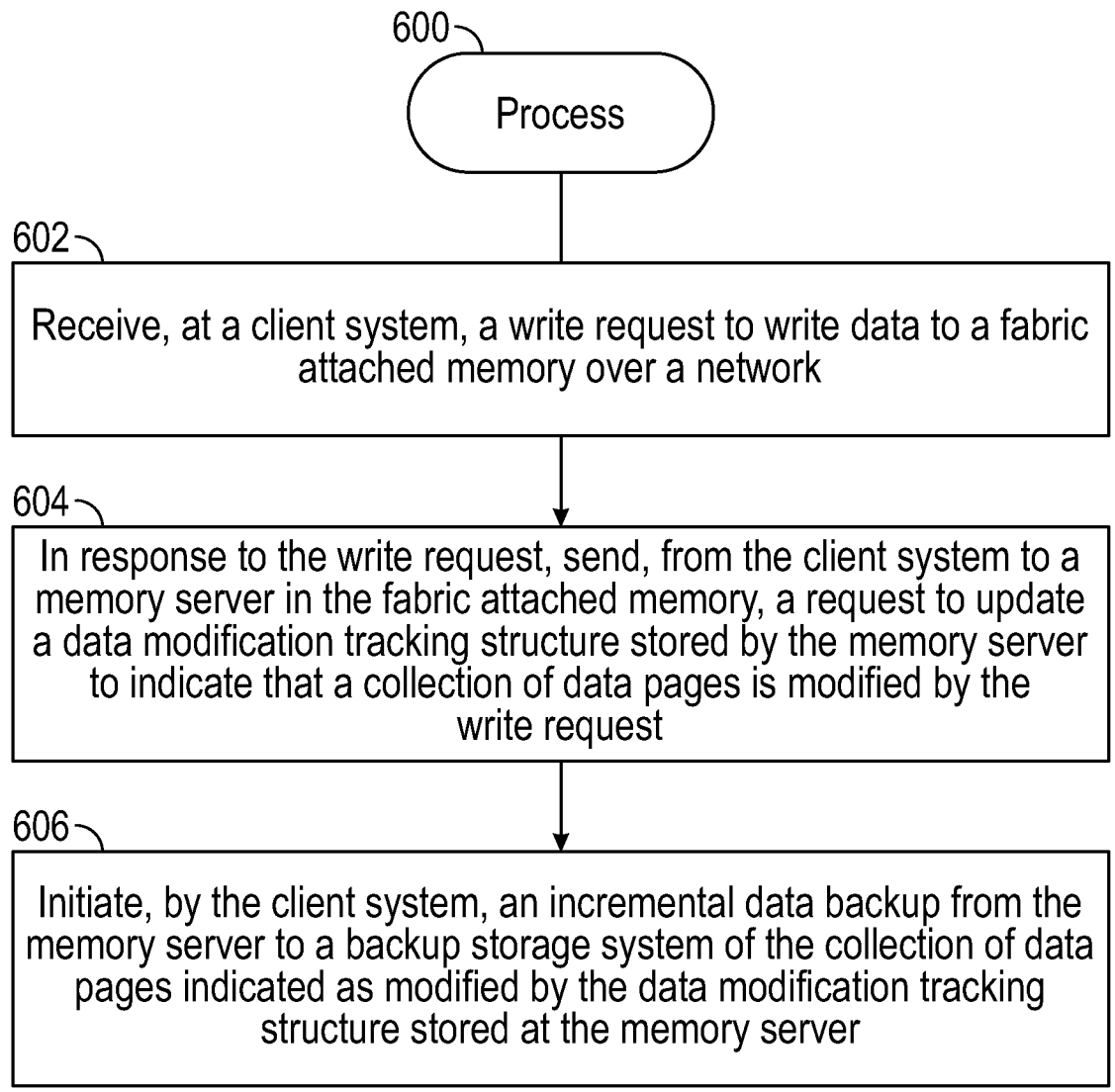
FIG. 6 is a flow diagram of a process according to some examples.

FIG. 6 is a flow diagram of a process 600 according to some examples. The process 600 includes receiving (at 602), at a client system, a write request to write data to a fabric attached memory over a network. The write request can be from a requester in the client system, or external of the client system.

The process 600 includes, in response to the write request, sending (at 604), from the client system to a memory server in the fabric attached memory, a request to update a data modification tracking structure stored by the memory server to indicate that a collection of data pages is modified by the write request. In some examples, the request to update data modification tracking structure is part of a scatter request that identifies both data pages to be updated and the data modification tracking structure to be updated.

The process 600 includes initiating (at 606), by the client system, an incremental data backup from the memory server to a backup storage system of the collection of data pages indicated as modified by the data modification tracking structure stored at the memory server.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A storage medium (e.g., 400 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a client system to:

in response to a request to modify a first data page at a memory server in a remote access by a client over a network, send, from the client system to the memory server, a request to update a data modification tracking structure stored by the memory server to indicate that the first data page is modified; and initiate, by the client system, an incremental data backup from the memory server to a backup storage system of data pages indicated as modified by the data modification tracking structure stored at the memory server.

2. The non-transitory machine-readable storage medium of claim 1, wherein the memory server is part of a fabric attached memory comprising a plurality of memory servers, and wherein the incremental data backup is of data pages from multiple memory servers of the plurality of memory servers to the backup storage system.

3. The non-transitory machine-readable storage medium of claim 2, wherein each memory server of the multiple memory servers comprises a respective data modification tracking structure indicating which data pages are modified, and wherein the incremental data backup is of the data pages from the multiple memory servers to the backup storage system identified as modified by the data modification tracking structures in the multiple memory servers.

4. The non-transitory machine-readable storage medium of claim 1, wherein the data modification tracking structure comprises a modified pages tracking bitmap including a plurality of bits that indicate which data pages are modified.

5. The non-transitory machine-readable storage medium of claim 1, wherein the instructions upon execution cause the client system to:

receive a write request to write data to a fabric attached memory including the memory server; and in response to the write request:

determine a collection of data pages involved in a write operation specified by the write request, and issue an input/output (I/O) scatter operation to the fabric attached memory to update the collection of data pages involved in the write operation, and to update the data modification tracking structure.

6. The non-transitory machine-readable storage medium of claim 5, wherein the issuing of the I/O scatter operation comprises sending a scatter request that includes information identifying the collection of data pages and a memory address of the data modification tracking structure.

7. The non-transitory machine-readable storage medium of claim 5, wherein the I/O scatter operation is to cause the memory server to update the collection of data pages and the data modification tracking structure.

8. The non-transitory machine-readable storage medium of claim 1, wherein the request to modify is to perform a modification of the first data page according to a remote direct memory access (RDMA) write by the client system of a memory of the memory server over the network.

9. The non-transitory machine-readable storage medium of claim 1, wherein the update of the data modification tracking structure is according to a remote direct memory access (RDMA) write by the client system of a memory of the memory server over the network.

10. A fabric attached memory system comprising:
a memory server comprising a memory to store a data modification tracking structure;
a network interface to communicate over a network with a client system, the network interface to receive, from the client system, an update request to update the data modification tracking structure, the update request being responsive to a write request to write data from the client system to the memory server, wherein the update request is to cause a modification of the data modification tracking structure to indicate that a collection of data pages is modified responsive to the write request; and
a processor to:
receive a backup request from the client system; and
in response to the backup request:
identify, based on the data modification tracking structure, the collection of data pages that has been modified, and
perform an incremental data backup of the collection of data pages from the memory server to a backup storage system.

11. The fabric attached memory system of claim 10, wherein the update request comprises a remote direct memory access (RDMA) write of the memory of the memory server that updates the data modification tracking structure.

12. The fabric attached memory system of claim 11, wherein the update request is part of an input/output (I/O) scatter operation that is to update the data modification tracking structure and the collection of data pages.

13. The fabric attached memory system of claim 12, wherein the I/O scatter operation is responsive to a scatter request that includes information identifying the collection of data pages and a memory address of the data modification tracking structure.

14. The fabric attached memory system of claim 10, wherein the processor is to:
in response to the backup request from the client system:
lock a memory region in the memory of the memory server to prevent updates of the memory region by further write requests from the client system, and
redirect the further write requests to a journal in the memory server.

15. The fabric attached memory system of claim 14, wherein the processor is to:
after a completion of the incremental data backup, play back the further write requests from the journal to update the memory region according to the further write requests.

16. The fabric attached memory system of claim 15, wherein the processor is to:
after playing back the further write requests from the journal, unlock the memory region.

17. The fabric attached memory system of claim 14, wherein the memory region is identified by the backup request from the client system.

18. A method comprising:
receiving, at a client system, a write request to write data to a fabric attached memory over a network;
in response to the write request, sending, from the client system to a memory server in the fabric attached memory, a request to update a data modification tracking structure stored by the memory server to indicate that a collection of data pages is modified by the write request; and
initiating, by the client system, an incremental data backup from the memory server to a backup storage system of the collection of data pages indicated as modified by the data modification tracking structure stored at the memory server.

19. The method of claim 18, wherein the request to update the data modification tracking structure is part of a scatter request sent to the memory server to update both the collection of data pages and the data modification tracking structure.

20. The method of claim 18, wherein the request to update the data modification tracking structure comprises a remote direct memory access (RDMA) write of the fabric attached memory.

* * * * *